INVENTORS
ANTHONY JOHN ANDREATCH,
WILLIAM BEVERIDGE INNES
BY
Samuel Branch Walker
ATTORNEY.

INVENTORS.
ANTHONY JOHN ANDREATCH,
WILLIAM BEVERIDGE INNES.
BY
Samuel Branch Walker
ATTORNEY.

March 27, 1962  A. J. ANDREATCH ETAL  3,027,241
AIR POLLUTION MEASUREMENT
Filed Dec. 1, 1959  4 Sheets-Sheet 4

INVENTORS.
ANTHONY JOHN ANDREATCH,
WILLIAM BEVERIDGE INNES
BY
Samuel Brand Walker
ATTORNEY.

3,027,241
AIR POLLUTION MEASUREMENT
Anthony John Andreatch and William Beveridge Innes, Stamford, Conn., assignors to American Cyanamid Company, New York, N.Y., a corporation of Maine
Filed Dec. 1, 1959, Ser. No. 856,596
8 Claims. (Cl. 23—254)

This invention relates to a method and apparatus for the continuous analysis of a gas stream for hydrocarbons and halocarbons and to methods and apparatus for utilizing a continuous gas analyzer, for hydrocarbons or halocarbons, particularly for the analysis of the products of combustion of internal combustion engines, including air contaminated with such products, but including chromatographic column streams, differential analysis, as in petroleum exploration, or leak detection, acetylene from the action of water on calcium carbide, for indirect water analysis, etc.

The present system of analysis is based upon the electrical conductivity of a burning hydrogen-oxygen jet, to which flame is fed the stream to be analyzed. A high impedance voltmeter is used to measure the electrical resistance between the jet and an electrode suspended in the flame. Such a flame detector alone, or in a bridged system, has sensitivity to measure less than 5 parts per billion of hydrocarbon expressed as methane using laboratory gases. With specially purified gases in all streams such as are obtained by passing gas streams over glowing platinum, hydrocarbon impurities can be oxidized or cracked if no oxygen is present, nitrogen, oxygen and hydrogen and ambient air may be prepared which has a very low hydrocarbon content. With such precautions, a sensitivity of at least as low as 0.1 part per billion can be obtained. Most laboratory gasses, and laboratory air contain some hydrocarbons, and such hydrocarbons increase the noise level.

This very sensitive measurement permits use in detecting and measuring the hydrocarbon and halocarbon content in dilute streams, and is particularly useful in analyzing the products of imperfect combustion in the exhaust streams of internal combustion engines.

The present flame ion detector is not sensitive to carbon dioxide, carbon monoxide, the oxides of nitrogen, carbon disulfide, sulfur dioxide, water vapor, etc.

The flame ion detector utilizes ions and/or electrons produced in combustion and such ions and electrons are produced by the rupture of carbon to hydrogen bonds and carbon to halogen bonds as for example in carbon tetrachloride, chloroform, methane, ethane, and the like. Conductivity is largely a function of the total carbon present which carbon is in compounds containing carbon to hydrogen or carbon to halogen linkages. Twice the reading is obtained per mol of ethane as is obtained per mol of methane etc. The relative reading is normally a function of the number of carbon atoms which have a hydrogen or halogen attached to that carbon atom, hence per mol of gaseous compound a relative reading of 1 would be obtained for methane, a reading of 2 for ethane, ethylene and acetylene and ethanol. A reading of 3 would be obtained for propane, propylene, cyclopropane, propanol etc. A reading of 4 is obtained for butene, isobutene, butene-1, butene-2, isobutylene, butadiene, butanol, isobutenol, and the like. A reading of 6 is obtained from hexane, benzene, cyclohexene, etc. The reading for the halogenated hydrocarbons such as chloroform or the totally halogenated hydrocarbons such as carbon tetrachloride is slightly less than for the carbon-hydrogen type of bonds. Independent calibration curves are established for the chloroflorohydrocarbons normally used as refrigerants and sometimes sold under the name "Freon." Inasmuch as approximately the same response is obtained for both saturated and unsaturated hydrocarbons the present detector is particularly useful for analyzing the products of combustion of an internal combustion engine.

The products of combustion of the internal combustion gasoline engine and diesel engine are blamed for the production of the smog which is such a problem in air pollution in certain cities, particularly Los Angeles. One of the big problems has been the method of measuring both the contaminants in the air and contaminants or unburned organic material in the exhaust stream. In the past such devices as infrared analyses have been used. Such infrared analysers are quite bulky, require considerable skill to handle and are comparatively slow. The present device has a far greater sensitivity than any previous device known, is fast, economical and easy to operate.

By measuring products of combustion in a gas stream and then passing such an exhaust gas stream through a catalyst system and again measuring, the efficacy of the catalyst system to oxidize the unsaturates and other unburned hydrogen-carbon compounds is easily determined. The use of more effective catalysts or after-burners is one method of solving the pollution problem.

As used in this application the term hydrogen-carbon compounds is defined as those compounds having hydrogen to carbon bonds. This includes nearly all organic compounds.

If the hydrogen-carbon compounds are not slightly volatile, the compounds can be detected when suspended as a dust, or aerosol, and so carried to the flame of the flame ion detector.

The present detector is sufficiently sensitive to detect and measure hydrogen-carbon impurities in the air in American cities. This is important for determining levels of air pollution and their sources and for air pollution research.

The exhaust gases or air containing exhaust gases or other unburned hydrocarbons may be measured directly to determine the quantity of hydrogen-carbon containing components present, or it may be passed through a chromatographic column to selectively absorb certain of these components and delay their rate of passage. By using such a system the various individual components are separated and analyzed. Thus it is possible to detect and measure the individual amounts of methane, ethane, acetylene, ethylene, butene, butadiene, butane and pentane, etc. where the amounts of each are measured in parts per billion and the total amount is less than $\frac{1}{10}$ of a part per million. Such a sensitivity is both unexpected and most useful. For the first time the present device makes possible the direct determination of the hydrogen-carbon components present in contaminated air from which smog is produced. It also becomes possible for the first time to determine the relative effects of various components so that efforts may be made to selectively remove or dispose of the more disadvantageous products before they are released to the air.

Solid carbon compounds which volatilize and decompose at flame temperatures are also measured. Hence, solid carbon compounds or hydrogen-carbon smoke or smog particles which are suspended in the gas stream are included in the measurement. Accordingly, finely divided solids may be either included by permitting them to remain in the gas stream analyzed or may be excluded by collecting them in a fine porous filter which will remove such solid components.

Care must be used in operating the present instrument to avoid the accidental release of cigarette smoke or the products of combustion of striking matches because both of these common items release sufficient organic compounds containing carbon to hydrogen linkages into the air that if air containing such contaminants is introduced into the detector, spurious readings are obtained.

The instrument may be used to analyze ethanol in the breath of suspected drunken driver or others. Columns may be used to differentiate between alcohol and acetone or other hydrogen-carbon components.

Similarly, the instrument may be used for exploration for oil and gas by measuring the concentrations of hydrocarbons in a particular area and by plotting the concentrations in an area from the air above the ground or from air drawn from beneath the surface of the ground. The areas in which a higher hydrocarbon content occur can be located and such areas are in general indicative of the presence of petroleum deposits beneath the surface. Of course, allowance must be made for the spillage of petroleum products on the surface by trespassers.

In the distribution of gas, either natural or artificial, certain carbon-hydrogen compounds are present. Methane and ethane for instance are particularly common constituents of natural gas. By measuring the methane and ethane content of the air above a gas pipeline, small leaks in the gas line can be detected. Methane may be present from swamp gas or sewer gas or organic decomposition.

Similarly, in chemical plants and oil refineries where various plant streams are being used the total carbon-hydrogen content of the stream can be measured. The device may be used for detecting toxic gases, for instance, hydrogen cyanide has a carbon-hydrogen bond and activates the meter. Other uses include measuring of the vapor pressure of hydrocarbons or determining the carbon-hydrogen constituents in volatile compositions directly or indirectly.

The present device may be used indirectly to measure moisture content by passing a gas stream through the instrument measuring the total hydrocarbon content, then passing the same gas stream through a calcium carbide cell, and measuring the additional acetylene present from the reaction of moisture with calcium carbide. A Grignard system can be used to release a hydrogen-carbon compound by reaction with water.

The change in composition of such a nature is particularly easily measured by using a bridge system in which the stream before reaction with calcium carbide is used in one leg of the bridge and after passing through calcium carbide in the other and using the signals to oppose each other thus the different signal is a function of the acetylene produced from the water vapor in the stream.

Chromatographic systems may be used at the head of the detector to alter the composition to remove components in a predictable order, or release the components in a predictable order so that each may be measured separately, or by otherwise modifying the gas stream. Similarly, either heat or cooling may be used to selectively remove constituents from the stream prior to measurement.

In the past, conductivity measurements of a gas flame have been used for determining the oxygen content of one of the components as for example shown by a patent to D. E. Richardson 2,511,177, June 13, 1950. Similarly, measurements of flame conductivity have been used in circuits to determine the combustion characteristics of the gases to control oxygen acetylene flames and the like. Burning gas streams have even been used as rectifiers.

In the past, vapor phase chromatography has been limited by the detector used in determining the composition or change in composition of the effluent gas stream. One of the methods which has been used for a long time is based upon the change in thermal conductivity with the change in composition of a gas. Others have been based upon the influence of radiation of the effluent gas or the change in the heat of the flame when a portion of the carrier gas is burned with a constant stream of a flame supporting gas such as hydrogen.

More recently it has been found that a hydrogen flame could have added thereto the effluent from a chromatographic column, after which the hydrogen is burned and the conductivity measured of the gas flame.

It has been now found that by using a concentric jet in which the inner jet is hydrogen and the outer jet is an oxygen containing gas, such as oxygen or air, the sample may be burned by adding to either the hydrogen or oxygen containing steam, the gas containing the products to be measured. The conductivity of the products of combustion are an indication of the hydrogen-carbon content of the sample.

A concentric jet permits mixing the hydrogen and the oxygen containing stream at a later time, to avoid explosion hazards of mixing oxygen and hydrogen before combustion, also the concentric jet permits easier control of the oxidizing gas than if the ambient air is used to support combustion. The air in most locations has a hydrogen-carbon concentration above the threshold of sensitivity of the instrument.

The dead space is also minimized so that faster response time is obtained.

For less exacting conditions, a single hydrogen jet gives good results.

In view of the fact that the electrical conductivity of the flame is comparatively low, an extremely high impedence circuit is used for measuring; particularly at low concentrations.

Amazingly the conductivity is found to be a straight line function from less than 5 parts per billion of hydrocarbon expressed as methane to about 5% and with some change in curvature the calibration curve is found to give effective measurable results up to at least 40% methane in a carrier gas. This is a most remarkable sensitivity range.

Particularly at the low concentrations of hydrogen-carbon or halogen-carbon a well-shielded, sensitive measuring device is necessary. At higher concentrations the sensitivity need not be so great. For high impedance measurements well-shielded leads are used to protect the instrument from stray electrical fields. Similarly, inasmuch as the grid resistor is preferably of the order of magnitude of $10^6$ to $10^{12}$ ohms, it can be seen that all portions subjected to potential are necessarily of an extremely resistant material in order that leakage currents do not interfere with measurements.

Without being limited to the specific details set forth in the preferred examples, but instead being limited by the invention as expressed in the appended claims, the following figures and examples are given as illustrative of certain embodiments of the new apparatus and its use.

In the construction of the present ionization detector it is necessary to use the fastidious techniques required for extremely high impedance circuits. Leakage resistances of greater than a million million ohms ($10^{12}$ ohms) can cause erroneous readings at the higher resistance measurements used for the greater sensitivities.

Combustion Chamber

Figure 1:
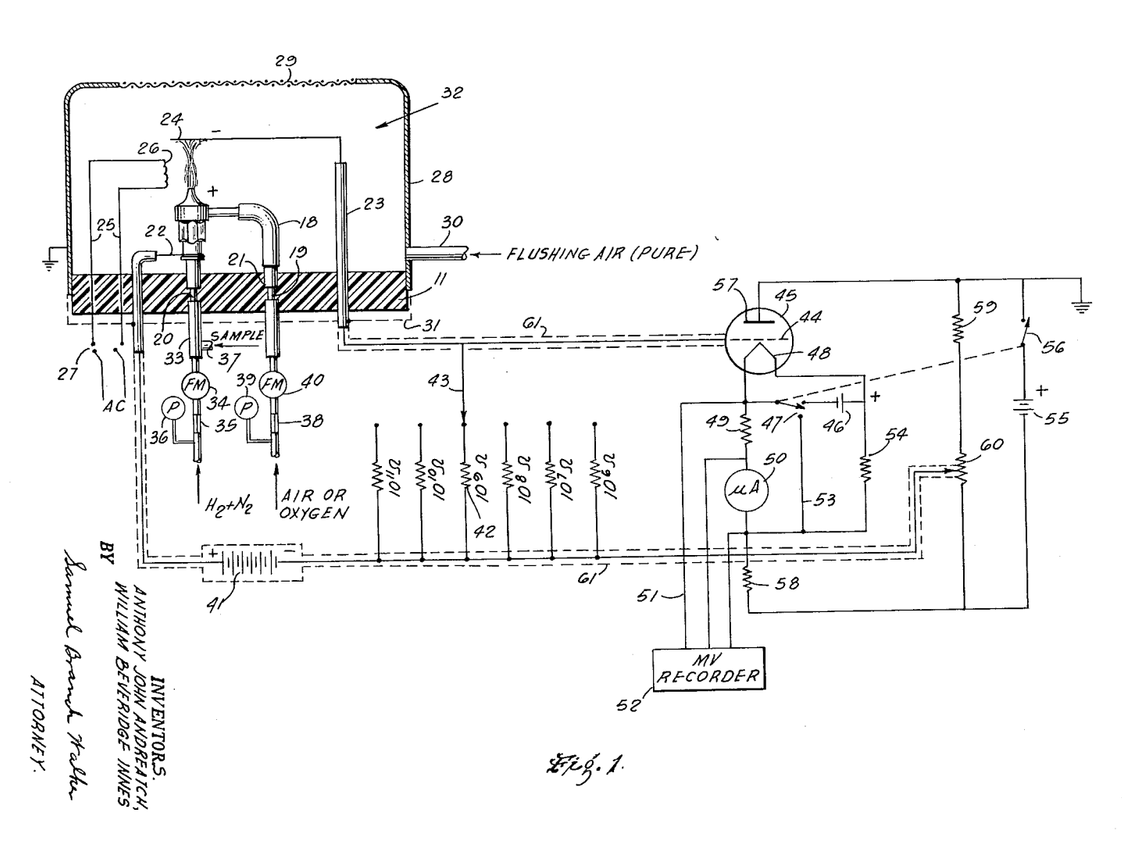
FIGURE 1 is a cross-section view of the combustion apparatus and a wiring diagram of the electrical circuit.
Figure 2:
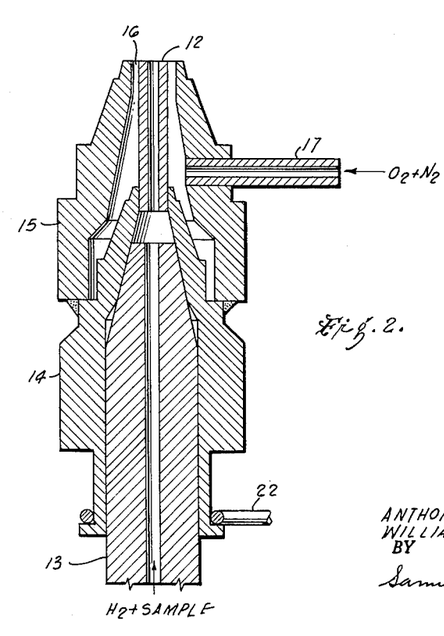
FIGURE 2 is a cross-section of the concentric jet assembly.

The burner chamber base 11 is constructed of a plastic with an extremely high insulating value. Preferably it is a polytetrafluorethylene although a metallic base using insulating sleeves such as glass sleeves may be used. Through this base extends the wiring circuits and the gas flow tubes. As shown in FIGURE 2, representing a preferred embodiment, the inner jet 12 is mounted on a fuel jet support 13. While other materials of construction may be used, a stainless steel hypodermic needle of about 22 gauge makes an excellent inner jet. The inner needle hub 14 is mounted on the fuel jet support 13 which is a piece of glass or brass tubing of a size to fit the hub of the inner needle, which in turn is mounted in the burner chamber base 11. It is preferred that the fuel jet support extend only part way into the burner chamber base so that the insulating characteristics of the burner chamber base separate the complete burner assembly from the gas supply lines electrically.

Concentrically mounted on the inner jet is the outer jet 15. Conveniently but not necessarily the outer jet is a hub of a hypodermic needle concentrically mounted on the hub of the inner needle and soldered or brazed thereto. Silver soldering is preferred. Preferably the size of the outer jet is such that the concentric oxidizer orifice 16 has an area of at least as great as the gas flow area of the inner jet 12 but not more than 3 or 4 times that area. Into the outer jet feeds the oxidizer gas line 17. This is preferably metal also silver soldered into the jet outer. An oxidizer gas line elbow 18 as shown in FIGURE 1 connects to the oxidizer flow port 19 in the burner chamber base. The oxidizer flow port 19 and the hydrogen flow port 20 in the burner chamber base are preferably comparatively small holes extending through the burner chamber base which are counterbored at the upper and lower end. The counterbores at the upper end receive the fuel jet support and the oxidizer gas line elbow against the shoulders 21 of the counterbored port. By having a counterbore and a comparatively small gas flow port in each line there is no danger of insetting the fuel jet support or the oxidizer gas line elbow too deeply into the burner chamber base and thereby introducing a high resistance short. The short length of small size in the oxidizer flow port and the hydrogen flow port each cut down on the dead gas space and insure extremely high insulating value. It is desirable that the dead gas space be kept to a minimum in order that changes in sample gas concentrations are reflected in the flow of gas through the concentric oxidizer jet and the inner jet as rapidly as possible, thereby increasing the speed of response of the instrument. It is preferred that both the inner jet and the outer jet be of stainless steel or other corrosion resistant metal. The tops of the two jets are preferably in the same plane. The jets may be ground at the same time, after assembly, against a grinding wheel, being careful to avoid the production of burrs. By having the jets of the same length the risk of the inner or outer jet becoming overheated by contact with the flame is minimized. If either the inner jet or the outer jet becomes overheated such jet may introduce extraneous ions into the flame and change the reading of the instrument. Either the inner or the outer jet may be of glass; but if of glass, the instrument is more fragile and ions released by the glass may give false readings. When constructed of metal, in the preferred embodiment, the risk of differences of potential at different places on the jet assembly is minimized, and the jet assembly is extremely rugged and mechanically stable.

To a metallic part of the jet assembly is attached a burner lead 22. This burner lead is an electrical conductor which passes through the burner chamber base to the electrical parts of the apparatus. Preferably the burner lead is a shielded lead which is well insulated. Polytetrafluorethylene insulation is preferred. Other high resistance plastic may be used as insulation if care is used during assembly to avoid contact of the bare fingers with the insulation as many of the other plastics are more susceptible to fingerprints and the traces of contamination from a fingerprint across the insulation of a lead can form a high resistance short which leads to instability in the assembled device.

Also extending through the burner chamber base is a collector screen support 23. Conveniently this collector screen support is an insulated wire which furnishes both mechanical support to a collector screen 24 and serves as an electrical connection to the collector screen. The collector screen is preferably of a corrosion resistant metal such as platinum or nickel. The platinum or nickel is spot welded to the collector screen support at a point outside the flame above the jet. The collector screen may either be a coil of wire or a single wire but is preferably a woven screen or perforated screen which is placed above the jets in such a position that the combustion flame above the jets impinges directly upon the screen. Conveniently the screen extends beyond the flame in all directions. The portions extending beyond the flame act as heat radiators to keep the screen cool, to avoid secondary emission, and lengthen screen life. A screen about 1 centimeter in diameter of platinum makes a very satisfactory collector screen. The screen is located at a height of from about 2.5 to 15 millimeters above the jets. A height of 7.5 millimeters gives very good results. The screen height is not critical. Also extending through the burner chamber base are two igniter leads 25 which extend to an igniter coil 26 which is placed adjacent but not in the flame. The igniter coil is preferably a resistance wire which is connected by the igniter leads to a suitable power source, for example, an alternating current transformer, to cause the igniter coil to glow red and ignite the hydrogen jet. A double pole igniter switch 27 is provided to disconnect both leads of the igniter coil from the current supply after the flame has been ignited.

Closely fitting on the burner chamber base 11 is a burner shield 28. The burner shield is a metallic shield which fits closely on the burner chamber base and has a foraminous area 29 directly above the burner itself and which shield is grounded. The entire shield may be of wire mesh but conveniently a metallic foil such as an aluminum foil is used, the portion above the jet either being perforated or having a built in screen.

For use where the air surrounding the instrument may be contaminated, it is preferred that the burner shield be of a metallic foil through which extends a flushing air line 30. A gentle current of pure flushing air is fed through this flushing air line to carry away the products of combustion and to insure that the air coming in contact with the burner from the outside is free from gases containing hydrogen-carbon or hydrogen-halogen compounds which might give an erroneous reading.

Unless the burner assembly is mounted on and extends into an electrical instrument box which is itself a shield, it is preferred that an additional shield extend around the bottom side of the burner chamber base. This bottom shield 31 has holes in it for the various leads into the burner chamber 32 formed by the burner chamber base and the burner shield 28. Shields on the collector screen support 23 and the burner lead 22 may be electrically connected to this burner bottom screen where they pass through the screen.

Gas Feed System

Underneath the hydrogen flow port 20 is a hydrogen supply line 33. In the hydrogen supply line is a hydrogen flow meter 34, a hydrogen capillary flow orifice 35 and a hydrogen pressure gage 36. Hydrogen is supplied from a suitable source such as a compressed hydrogen tank through a reduction valve to the pressure gage at the high pressure end of the hydrogen capillary flow orifice. The hydrogen capillary flow orifice may conveniently be a piece of thermometer tubing or other tubing having such a small opening that pressure drop through the tubing is considerable and the flow a function of the hydrogen pressure on the orifice. The flow can be measured through a flowmeter and adjusted by changing the pressure at the pressure gage to adjust the hydrogen flow to a desired rate.

A sample T 37 in the hydrogen flow line feeds a sample into the hydrogen and with the hydrogen into the jet.

The hydrogen conveniently has at least some nitrogen mixed with it to reduce the flame temperature. The amount of nitrogen mixed in with the hydrogen depends in part upon the amount of diluent gases supplied with the sample. If the sample is comparatively dilute, with a high proportion inert gases, pure hydrogen may be used but if the sample is more concentrated, pure hydrogen mixed with about 50% nitrogen is preferred.

Air or oxygen is supplied to the oxidizer jet. The air or oxygen is supplied from a pressure source through an oxygen capillary flow orifice 38. There is a pressure gage 39 to measure supply line pressure which pressure is adjusted so that the rate of flow through the capillary is as desired. An oxidizer flow meter 40 measures the feed rate of the oxidizer gas. Pure oxygen may be used as the oxidizer, but preferably is mixed with at least some nitrogen to avoid too high a flame temperature. The air or oxygen supplied as the oxidizer is desirably comparatively free from hydrogen-carbon or hydrogen-halogen containing substituents in order that there is not an undue background or a false signal due to detectable materials introduced as contaminants with the oxidizer gas supply.

Some hydrogen-carbon substituents may be present in the supplied gases, and be subtracted out on the recording circuit by the zero level adjustment, if the concentration is constant. The more sensitive ranges require better control of background noise, to which such contaminants contribute. Commercially available prepurified nitrogen and oxygen contain some hydrogen-carbon substituents frequently from 0.1 to 100 parts per million.

*Electrical System*

The flame polarizing battery 41 is connected so that the burner jet is positive and the negative lead from the battery passes through a grid resistor 42 to the collector screen support 23 which is electrically connected to the collector screen 24. A grid selector switch 43 is used to select a grid resistor of the proper value. The polarizing battery may have a value of from about 15 to 350 or more volts. The sensitivity increases rapidly as the voltage is increased to about 115 volts. Between about 115 and 340 volts the sensitivity is constant. A greater voltage is unnecessary. The value of the grid resistor may vary from about one million ohms to one million million ohms ($10^6$ to $10^{12}$ ohms). As seen in the FIGURE 1 a good selection is to have resistor values selectable at will of $10^6$, $10^7$, $10^8$, $10^9$, $10^{10}$, and $10^{11}$ ohms. A grid resistor is selected which has a value which gives a good instrument reading with the hydrocarbon concentration in the sample stream.

The collector screen is connected to the grid 44 of a vacuum tube 45. The vacuum tube is necessarily a high impedance tube. Tubes which are used for electrometers are preferred. A tube such as tube type 5803 or Victoreen VX55 gives good results. Such a tube requires a plate voltage of 7½ to 15 volts, a control grid voltage of about −1.7 volts and requires a grid control current in the order of $2 \times 10^{-14}$ amperes. Such a tube may have an amplification factor (Mu) of about 2.0 and a mutual transconductance (Gm) of about 150 micromhos. A standard electrometer circuit may be used.

As shown this consists of a filament battery 46 wired through a single-pole double-throw switch 47 to the filament 48 of the tube 45. In the cathode circuit of this tube are a cathode resistor 49 and a microammeter 50. Conveniently the cathode resistor 49 has half the resistance of the microammeter 50 and millivoltmeter recorder leads 51 lead to a millivoltmeter recorder 52 so that it may be connected in shunt across the microammeter or the cathode resistor or both to give a sensitivity of 1, 2, or 3. Typical values of the microammeter resistance and the cathode resistance are 2200 and 1100 ohms respectively. A 10 millivoltmeter recorder connectable at will across 1100, 2200 or 3300 ohms as a cathode resistance gives good stable values. A shunt 53 leads around the microammeter and the cathode resistor and is connected to the second pole of the single-pole, double-throw filament switch so that when the filament is disconnected from the battery and the instrument turned off, the microammeter is shunted through the cathode resistor. By so shunting the microammeter, the needle is damped and the meter is less sensitive to mechanical injury during handling.

A stabilizing resistor 54 shunts the filament battery to the cathode return. The negative end of the battery is connected to the cathode lead and by having the stabilizing resistor 54 in series with the cathode resistor and the microammeter, as a shunt to the filament battery, a slight positive bias is introduced by this battery circuit to the cathode return and greater stability of calibration is thereby obtained. A value of about 15,000 ohms on the stabilizing resistor gives good results.

A plate battery 55 is connected through a plate current switch 56 to the plate 57 of the vacuum tube. The plate return is connected through the main cathode bias resistor 58 to the microammeter and through the microammeter and smaller cathode resistor 49 to the negative side of the filament. A value of about 50,000 ohms gives an adequate cathode bias. The plate battery and plate current switch are shunted by a plate shunt resistor 59 and a zero potentiometer 60.

For greatest sensitivity the entire polarizing battery circuit should be shielded by a shield 61, using shielded wires and an actual shield over the battery. Such shielding gives greatest sensitivity and stability.

As will be obvious to those skilled in electronic work, the shields may be omitted for lower sensitivity work, with a slight loss in stability. Similarly for convenience the plate current switch 56 and the filament switch 47 may be ganged.

The flame polarizing battery may have a switch in its circuit but in view of the extremely high impedances involved this battery has shelf life whether it is switched on or off.

Sources of electrical potential other than a battery may obviously be used in the apparatus but in view of the extremely high stability required such other potential sources would be unduly bulky and for the very small current required batteries furnish the most economical and portable source of power. The entire assembly is very small, is convenient and may be made portable for use in measuring hydrocarbon substituents in various areas or may actually be airborne as by a balloon for measuring smog at various altitudes over a city, a suitable transmitting system being used to give an indication by ratio of the indicator's readings.

Great care must be used in the grid circuit of the electrometer tube to avoid high resistance shorts. For example the grid resistors are preferably sealed in glass, and the glass shields are carefully washed and then handled only by forceps during manipulation including soldering into the system. The grid resistor selector switch must be one which has an extremely high resistance and is preferably of ceramic or polytetrafluorethylene construction in order that the resistance through the switch will be of the same order of magnitude as in the rest of the equipment.

Although sample introduction is shown into the hydrogen jet, the sample may be introduced with the air or oxygen jet. A sample introduction with the oxidizer gives results which are excellent, although results obtained when introducing the hydrocarbon into the hydrogen jet are preferred. Usable results are obtained at lower sensitivity even if the leads and potential to the flame is reversed. Greater sensitivity is obtained when the flame jet itself is the positive pole.

Bridge Circuits

Figure 3:
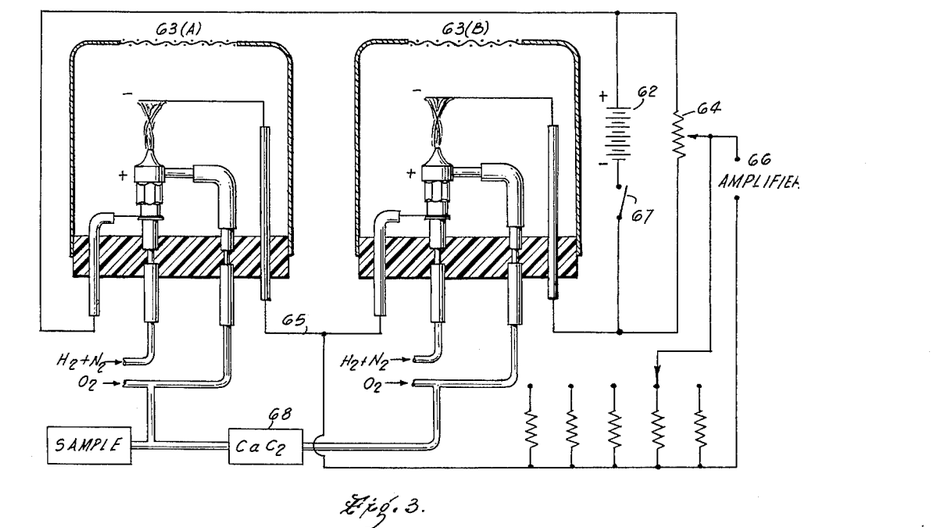
FIGURE 3 is a wiring diagram and diagrammatic sketch of a bridge detector system showing a delay line and a calcium carbide unit for water detection.

As shown in FIGURE 3 two of the flame ion detectors may be connected in a bridge circuit. Whereas, other bridges may be used, one satisfactory circuit involves connecting two of the jets and collector streams in series. As shown in FIGURE 3, a flame polarizing battery 62 is connected across two flame ion detectors 63 A and B, with the jets and screens arranged in series. The high resistance potentiometer 64 is connected across the flame polarizing battery 62 bridging the flame ion detectors. To the mid point of the potentiometer 64 and the central jet-screen connector 65 is connected an amplifier 66. A battery switch 67 provides for disconnecting the flame polarizing battery.

A mixture of hydrogen and nitrogen is supplied as a fuel and diluent and oxygen is supplied as an oxidizer, the same supply system being used to supply equal quantities of these gases to each of the flame ion detectors A and B. The sample is supplied and injected into the oxidizer supply of detector A directly; and through a calcium carbide cell 68 and then into the oxidizer supply of detector B. The sample may be supplied from any suitable source. The first detector gives an immediate reading of the hydrocarbon content of the sample stream. The second one gives a delayed reading due to the time required to go through the calcium carbide cell. If a dry sample is supplied the delay in passing through the calcium carbide cell and the longer supply line causes the detector B to give a somewhat later reading. Therefore the difference between the reading of A and B as measured on the bridge circuit is indicated by the amplifier as the rate of change of hydrogen-carbon components in the sample stream. If the sample stream is constant and contains moisture the calcium carbide reacts with the moisture to deliver acetylene and the additional concentration of the acetylene is measured on the amplifier.

Obviously a simple delay line may be used instead of the calcium carbide cell to give a reading of rate of change of the hydrogen-carbon components or an equivalent delay line may be introduced into the supply line of detector A so that the bridge is sensitive to only moisture content as the time of injection of the sample is adjusted to be equal. Other modifications of the bridge circuit may be used for other purposes which may be desired using the ideas embodied above.

Exhaust Gas and Smog Analysis

Figure 6:
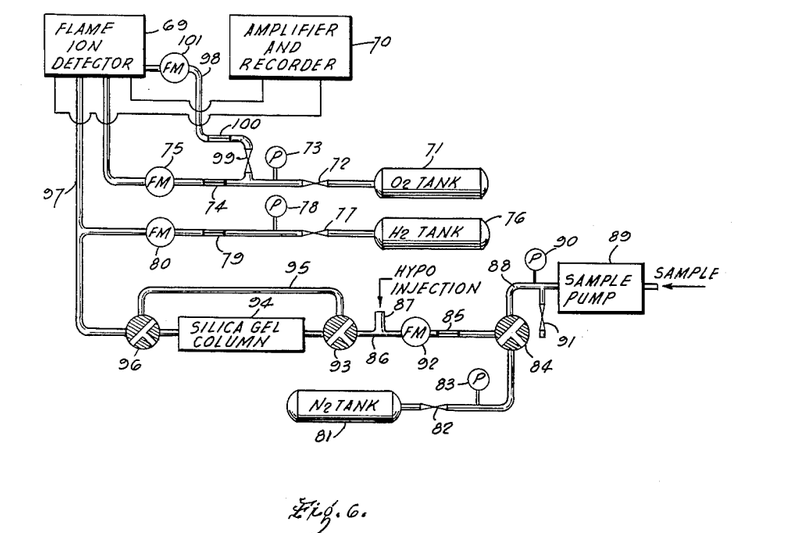
FIGURE 6 is a diagrammatic view of a portable self-contained form of the invention, which is particularly adapted to be used as an exhaust gas and smog analyzer.

FIGURE 6 shows an embodiment of the present flame detector particularly suitable for analysis of exhaust gases from combustion engines such as automobiles and for analysis of smog producing constituents in the atmosphere. In this embodiment the flame detector chamber itself 69 which may be as shown in FIGURE 1 is connected to an amplifier and recorder 70. The circuit shown in FIGURE 1 may be used or the microammeter alone may be used as a readout device. The oxidizer source used is pure oxygen or air from an oxidizer supply tank 71 which is under high pressure. The oxygen or air passes through the oxidizer control valve 72, past an oxidizer pressure gage 73 through an oxidizer flow control capillary 74 and an oxidizer flow meter 75 to the flame ion detector.

Hydrogen is supplied from a hydrogen pressure tank 76 through a hydrogen control valve 77 past a hydrogen pressure gage 78 through a hydrogen flow control capillary 79 through a hydrogen flow meter 80 to the burner jet of the flame ion detector.

Nitrogen under pressure is supplied from a nitrogen supply tank 81 through a nitrogen control valve 82 past a nitrogen pressure gage 83.

The nitrogen is passed through a stream selector T-valve 84. The output stream from this stream selector T-valve passes through a sample stream flow control capillary 85 to a manifold 86. A sample flow meter 92 is inserted before the manifold to show the flow rate of the stream.

Also connected to the manifold is a sample port 87. Conveniently, this is a T-joint into the manifold with a rubber closure, such as is used for injectible drugs, and which has a rubber member designed to be punctured by a hypodermic needle. Samples of gases can be injected from a hypodermic syringe by running the needle through the sample port 87 into the manifold and injecting the gas into the flowing nitrogen.

Also connected to the other arm of the stream selector T-valve 84 is a continuous sample flow line 88. A sample pump 89 supplies a continuous sample stream, from any source, past a sample pressure gauge 90 to the continuous sample flow line 88. A bleed valve 91 is provided to release surplus gas to control pressure. The sample stream flow rate is controlled so that either the flow rate of a carrier nitrogen stream, or from a sample pump is a desired value.

The metered flow passing from the manifold 86 passes to a selector T-valve 93, which passes the sample stream selectively through a silica gel column 94 or a by-pass 95 to an output T-valve 96, which feeds the sample stream into the hydrogen flow by a connector 97. The two T-valves 93 and 96 are operated so that a sample is selectively passed either directly through the by-pass 95, or through the silica gel chromatographic column 94 to the hydrogen stream to the flow ion detector.

A stream sample, for continuous analysis, or a single shot sample, fed by a hypodermic syringe to the nitrogen stream, may thus be either analyzed directly for total hydrogen-carbon compounds, or passed through a chromatographic column, so that individual components may be measured independently.

This embodiment is particularly convenient for portable use as the oxygen, hydrogen and nitrogen tanks may be small laboratory size tanks, the sample pump may be a hand operated pump and the entire device is portable and may be easily carried from place to place. The entire device may be carried by a balloon for measuring contaminents at any desired atmospheric level.

An oxidizer by-pass 98 may be provided to pass part of the air or oxygen from the oxidizer supply tank 71 past a secondary air valve 99 through a secondary air capillary 100, through a secondary air flow meter 101 to the combustion chamber of the flame ion detector. For use where the ambient air is low in hydrogen-carbon compounds, a simple ventilating port may be used, but controlled surrounding conditions for the burner jet are preferred for high sensitivity measurements, as the impurities in the surrounding air also give a response. Side vents in the outer jet may be used as bleed ports to supply a controlled secondary air, but an independent supply line gives better flow control. Similarly the gas control valves may be simple needle valves, but pressure regulator valves are easier to manipulate for accurate control of the flow of the various gas streams.

Use of Analyzer

The analyzer shown in FIGURE 6 may be used for measuring very low concentrations of hydrocarbons. Conveniently a sample from either the exhaust of an automobile or from air which is suspected of being contaminated is passed through the sample pump, mixed with the hydrogen, fed to the flame jet, and burned in the oxygen from the oxygen or air tank. The ratio of hydrogen flow in milliliters per minute to total gas flow in milliliters per minute should be below 0.58.

The response varies with the ratio of hydrogen to the diluting gases. A ratio of hydrogen to inert gas, plus oxidizer, of about 0.85 to 0.9, on a volume basis, gives the least variation of signal with a slight change in gas flow rates. A fairly flat plateau exists between a ratio of 0.7 to 1.2. Values outside these ratios give reproducible results but the instrument is less stable. Obviously helium or other inert gas may be used as the diluent.

An excess of oxygen is normally supplied.

The hydrogen flow rate for a 22 gauge needle jet may be from 15 to 50 milliliters per minute, and 25 to 35 gives preferred results. The ratio of hydrogen to other gases is more important than the absolute flow rate.

The gases are well mixed in the flame, so that the sample can be injected into either the hydrogen or the oxidizer jet. At least part of the oxygen may be mixed in the hydrogen jet. Such operation is convenient when part of the sample stream is oxygen. Flame instability results from too high a flow rate in the jets or too high a dilution of the hydrogen with inert gas and increases background noise.

Figure 7:
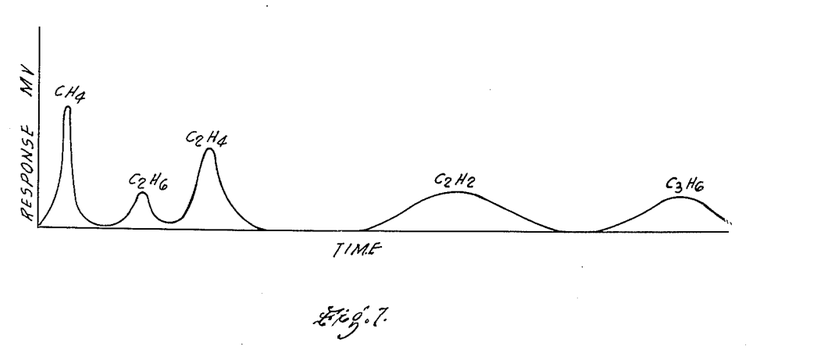
FIGURE 7 is a chromatogram of a typical gasoline engine exhaust gas through this analyzer.

If a reading of a particular sample is desired, the sample is run through the sample pump, directly through the bypass, mixed with the hydrogen, and burned in the jet and the potential measured. The flame ion detector is calibrated against known samples of approximately the same constitution under the same conditions. The response is proportionate to the number of carbons having carbon to hydrogen linkages or carbons having carbon to halogen linkages. The exhaust gas of an automobile or the atmospheric air may be measured for smog in this fashion. If it is desired to determine what are the constituents of smog, atmosphere, or exhaust gas, the T-valves 93 and 96 are turned to pass the sample through the silica gel column, a selected sample is injected by a hypodermic syringe, passed through the silica gel column and into the nitrogen stream. The gas then passes through the silica gel column, and develops the adsorbed hydrocarbon constituents. Methane itself passes almost directly through the column while the higher hydrocarbons pass through more slowly. A typical analysis is shown in FIGURE 7 in which the first peak is methane, the second one ethane, the third ethylene, the fourth acetylene and the fifth propylene. A silica gel column a quarter of an inch in diameter and 8 inches long gives good development. The silica gel column may be heated to insure the volatilization of higher hydrocarbons, or the column may be longer or shorter depending upon the discrimination desired between sample constituents. In each instance a flow of oxygen, hydrogen and nitrogen is maintained constant by use of the appropriate control valve to control the pressure of the gas forcing the gas through the flow control capillary and the flow meter.

The present device is sufficiently sensitive to measure impurities in ordinary city air. For example the methane content in a laboratory building was found to be about 3 parts per million.

Typical values of hydrogen-carbon constituents in city air, in New York City, was found to be 7.6 parts per million, calculated as volumes of methane per volume of air. Of this 2.2 parts per million were methane; 0.08 part per million of ethane (0.16 methane equivalent); 0.11 part per million pentane, and 0.13 part per million hexane.

In Stamford, Connecticut, in a county area, a value of 1.4 parts per million, reported as methane was obtained.

The area under the curve in the effluent from a chromatographic column is a measure of the amount of the particular constituent present in the sample. Either a continuous analysis or a selected sample analysis may be made. If a continuous analysis is used the signal response is a measure of a concentration of the sample gases containing carbon-hydrogen or carbon-halogen linkages.

In each instance the device is calibrated against known samples. The rates of gas flow and the exact physical configuration and sensitivity of the circuits is such that the sensitivity cannot be theoretically determined. However, known samples are run through the burner and a calibration curve established which remains constant for the particular instrument and flow rates being used.

Figure 4:
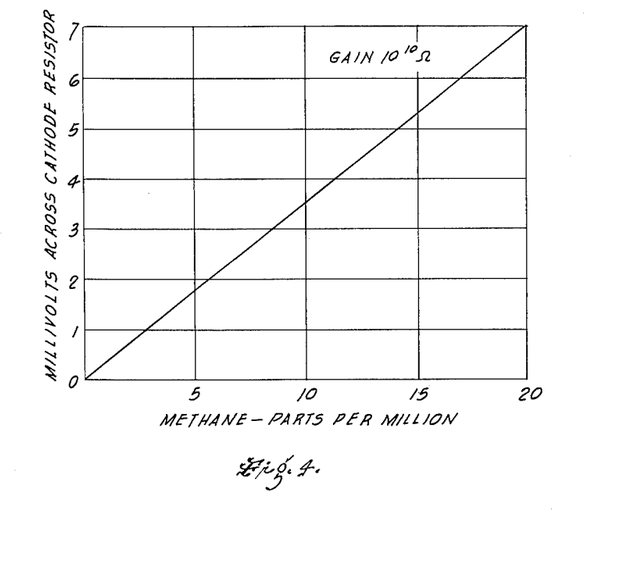
FIGURE 4 is a graph showing the millivolts across the cathode resistor against methane in parts per million for a grid circuit resistance of $10^{10}$ ohms.

FIGURE 4 shows a response expressed in millivolts across a cathode resistor of 1100 ohms against the methane content in parts per million of a sample gas (air) being introduced in the device of approximately 35 milliliters per minute in the outer jet and a hydrogen flow of 30 milliliters per minute through the inner jet. A grid resistance of $10^{10}$ ohms was selected.

Approximately the same calibration curve is obtained if the sample gas, in this case air containing methane, is mixed with the hydrogen and fed to the single inner jet, and the outer jet is not used.

Figure 5:
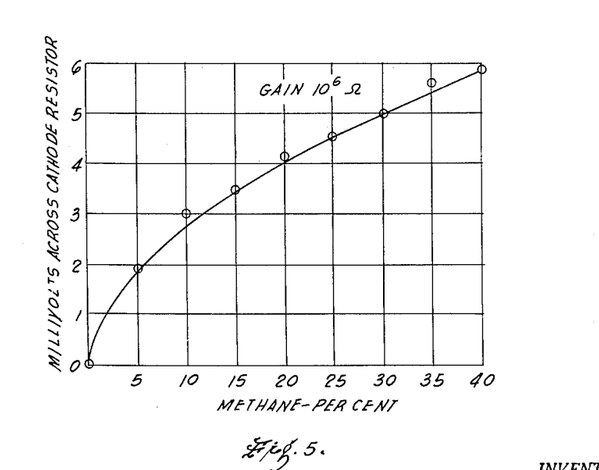
FIGURE 5 is a low sensitivity graph showing the millivolts across the cathode resistor with a resistance in the grid circuit of $10^6$ ohms against methane concentration in percent.

The same instrument at a much higher methane content gave the response shown in FIGURE 5 in which the sensitivity is diminished by using a $10^6$ ohm resistor in the grid circuit of the tube. At the lower concentrations the response is seen to be linear with concentrations. At concentrations above about 1% of methane, the curve no longer is linear but is reproducible up to values of at least 40% methane. More concentrated gases can be diluted.

Gases other than methane are used for calibration for the measurement of the concentration of such other gases. If a constant rate is to be used for a flow sample, the response is proportional to the total number of carbons containing hydrogen linked thereto, plus the value of those containing carbon with halogen linked thereto. The hydrogen-halogen calibration constant is slightly smaller; separate calibration is required for the halogen components. For straight hydrocarbons the responses thus are twice as great per mol for ethane as for methane, three times as much for propane and so on proportionally upward. Obviously, the vapor pressure of the sample gases must be such that they will remain in their vapor form and not condense out as liquids in the apparatus. If higher concentrations of higher hydrocarbons are used the entire apparatus may be warmed in a suitable oven to a temperature sufficiently high to keep the sample in the vapor form. Calibration on methane alone gives values which are satisfactory for determination of the contents of gases containing hydrocarbon linkages. Where a chromatographic column is used to differentiate between gases, a calibration sample may be used to determine where each sample comes off of a column and to synthesize a sample approximately that of the unknown sample to check and be sure that all of the peaks are as anticipated. With the more complicated samples which are found in smog, at times certain of the constituents overlap on the column and are difficult to separate. Longer columns can solve this difficulty.

*Differential Analysis*

The apparatus shown in FIGURE 3 is used for determining concentration gradients. Even if the air in the laboratory is contaminated or even if the source of oxygen has a certain amount of hydrocarbon vapors in it, still accurate readings may be obtained using the bridge circuit. Using the bridge shown in FIGURE 3 a delay line may be used and the apparatus carried along the ground. For pipe line leaks a short delay of about 5 seconds is useful, as the concentration gradients are sharp. For oil and gas exploration a delay of at least 2 minutes is useful, or an absolute concentration plot may be used. The variations in hydrocarbon content of the ambient air as it comes from very close to the ground can be plotted to give a measurement of the likelihood of underground deposits containing gases being found. Similarly, a delay line may be used to show the variation in hydrocarbon content as motor vehicles pass a given point or as the instrument is carried away from a highway serving as a source of contamination.

The same instrument may be used with the calcium carbide tube in place to determine the moisture content.

Inasmuch as a calcium carbide reacts with water, concentrations of water in gases can be measured at extremely low concentrations. The calcium carbide should be fresh so that an earlier history of moisture contamination does not disturb the accuracy of the apparatus.

Using the apparatus of FIGURE 3, 30 milliliters per minute of hydrogen is fed to each inner jet. 15 milliliters per minute of oxygen is fed to each concentric oxidizer jet. A sample of 20 milliliters per minute of air is also introduced in the outer stream.

The signal in the first ion detector is a measure of hydrogen-carbon concentration, and may be measured if desired. The additional signal from the second jet, as shown on the bridge indicates additional hydrogen-carbon, as acetylene from the reaction of calcium carbide with moisture in the air. A moisture content of room air of 1.5% is found on a typical day. The moisture can be measured even in very dry streams from drying equipment, when values of 0.1 part per million can be measured.

In order to test for ethyl alcohol in human breath, a chromatographic column is desired in order to discriminate between ethanol, acetone, hydrocarbons or other organic material. A 20% polyglycol on 70 to 100 mesh diatomaceous earth chromatographic column, ¼" diameter and 6 inches long, at room temperature permits detection of both acetone and ethanol. The sample is taken by blowing breath into a clean glass syringe. The sample is then injected into the column as shown in FIGURE 6, except for the column filling. Acetone is eluted in 45 seconds and ethanol is eluted in three minutes. With the sensitivity and selectivity of the analyzer, it is possible to measure the alcohol content in the breath 2 hours after drinking one ounce of liquor. It is also possible to distinguish a diabetic coma from alcoholism in a patient by measuring the acetone.

Using a single jet, burning in filtered room air, a hydogen flow rate of 25 milliliters per minute and a nitrogen flow rate of 35 milliliters per minute, and the above mentioned 6 inch polyglycol on diatomaceous earth column, with a 5 milliliter sample, using a $10^{10}$ ohm grid resistor and a calibrated scale, the results showed an alcohol content of off scale at 3 minutes, 2.5 millivolts equal to 10 parts per million of ethanol in air at 16 minutes; 0.95 millivolt, equal to 3.7 parts per million after 20 minutes, and 0.4 millivolt equal to 1.5 parts per million after 33 minutes. The column showed an acetone content of 0.5 part per million in the breath of the subject.

The exhaust gas of a gasoline engine can be analyzed not only from the standpoint of air pollution, but also to determine combustion efficiency. The exhaust from each cylinder can be independently analyzed to determine if the carburetion efficiency is equal in each cylinder etc.

Although the apparatus has been described for certain specific uses, its use for many other purposes is apparent, wherever it is desired to determine the amount of carbon to hydrogen or carbon to halogen linkages in hydrocarbons which exist in the vapor phase or may be transformed to the vapor phase. Such usages which come within the scope of the appended claims are part of the present invention.

We claim:

1. Apparatus for measuring the carbon-hydrogen and carbon-halogen composition of a gas comprising: an instrument base and fixed thereon a combination electrode and metallic hydrogen burner jet, mounted on said base a metallic electrode above and in the flame position of a flame from said jet, means to feed hydrogen at a constant rate to said burner jet, means to supply oxygen to said burner jet, means to feed a sample stream to the flame of said hydrogen jet, means to supply a potential of at least about 15 volts across said jet and said electrode, a metallic burner shield which fits closely on said base, the portion of the shield above said burner jet having perforations therein and which shield is grounded; said jet, said electrode and said shield being well electrically insulated from each other; and a very high impedance means to measure the conductivity between said metallic burner jet and said electrode.

2. Apparatus for measuring the carbon-hydrogen and carbon-halogen composition of a gas comprising: a combination electrode and inner metallic jet of small diameter, a concentric jet of larger diameter, the ends of said jets being in approximately the same plane, means to feed hydrogen to said inner jet at a constant rate, means to feed oxygen to the concentric jet at a constant rate, means to feed a sample gas, diluted with an inert gas with the hydrogen, a metallic electrode above said jets, high impedance circuit measuring means to measure the resistance between said inner metallic jet and said metallic electrode, thus measuring the resistance of a flame burning above said jets, and a metallic burner shield which fits closely on said base, the portion of the shield above said burner jet having perforations therein and which shield is grounded above and around said jet and metallic electrode system, whereby any static effects of ambient conditions are minimized; a resistance wire adjacent to the flame position, and means to selectively energize said resistance wire to ignite a flame.

3. Apparatus for measuring the carbon-hydrogen and carbon-halogen composition of a gas comprising: a combination electrode and inner metallic jet of small diameter, a concentric jet of larger diameter, the ends of said jets being in approximately the same plane, means to feed hydrogen to said inner jet at a constant rate, means to feed oxygen to the concentric jet at a constant rate, means to feed a sample gas, diluted with an inert gas with the oxygen, a metallic electrode above said jets, high impedance circuit measuring means to measure the resistance between said inner metallic jet and said metallic electrode, thus measuring the resistance of a flame burning above said jets, and a metallic burner shield which fits closely on said base, the portion of the shield above said burner jet having perforations therein and which shield is grounded above and around said jet and metallic electrode system, whereby any static effects of ambient conditions are minimized; a resistance wire adjacent to the flame position, and means to selectively energize said resistance wire to ignite a flame.

4. Apparatus for measuring the carbon-hydrogen and carbon-halogen composition of a gas comprising: an inner jet of small diameter, a concentric jet of larger diameter, at least one of the jets being of metal and also serving as a jet electrode the ends of said jets being in approximately the same plane, means to feed hydrogen to said inner jet at a constant rate, means to feed oxygen to the concentric jet at a constant rate, means to feed a sample gas with the hydrogen, a metallic electrode above said jets, high impedance circuit measuring means to measure the resistance between said jet of metal and said metallic electrode, thus measuring the resistance of a flame burning above said jets, and a metallic burner shield which fits closely on said base, the portion of the shield above said burner jet having perforations therein and which shield is grounded above and around said jet and metallic electrode system, whereby any static effects of ambient conditions are minimized.

5. Apparatus for measuring the carbon-hydrogen and carbon-halogen composition of a gas comprising: an inner jet of small diameter, a concentric jet of larger diameter, at least one of the jets being of metal and also serving as a jet electrode the ends of said jets being in approximately the same plane, means to feed hydrogen to said inner jet at a constant rate, means to feed oxygen to the concentric jet at a constant rate, means to feed a sample gas with the oxygen, a metallic electrode above said jets, high impedance circuit measuring means to measure the resistance between said jet of metal and said metallic electrode, thus measuring the resistance of a flame burning above said jets, and a metallic burner shield which fits closely on said base, the portion of the shield above said burner jet having perforations therein and which shield is grounded above and around said jet and metallic electrode system, whereby any static effects of ambient conditions are minimized.

6. Apparatus for measuring the carbon-hydrogen and carbon-halogen composition of a gas comprising: an instrument base of polytetrafluoroethylene, an inner jet of small diameter fixedly mounted with respect to said base, a concentric jet of larger diameter surrounding said inner jet also fixedly mounted with respect to said base, with the flame contacting ends of said jets in approximately the same plane, at least one of said jets being of metal, a hydrogen duct passing through said base, and means to supply hydrogen at a constant rate to said inner jet through said hydrogen duct, means to supply oxygen, diluted with an inert gas, through said concentric jet, means to feed a sample gas with the hydrogen, a metallic electrode support mounted upon said base, a metallic electrode on said electrode support positioned above said jets, said electrode support and said metallic jet being well insulated from each other by said base, a potential source of at least about 115 volts applying potential between said metallic jet as positive through a grid resistance of $10^6$ to $10^{12}$ ohms to said electrode support, a high impedance means to measure the potential across said grid resistor, a metallic burner shield which fits closely on said base, and has a foraminous area above said burner jet and which shield is grounded mounted on said base surrounding said jets, metallic electrode and electrode support, whereby any static or current leakage effects are minimized; and a resistance wire adjacent to the flame position above said jets, and electrical leads to said resistance wire passing through said base, and means to selectively energize said resistance wire to ignite a hydrogen flame above the jets.

7. Apparatus for measuring the carbon-hydrogen and carbon-halogen composition of a gas comprising: an instrument base of polytetrafluoroethylene, an inner jet of small diameter fixedly mounted with respect to said base, a concentric jet of larger diameter surrounding said inner jet also fixedly mounted with respect to said base, with the flame contacting ends of said jets in approximately the same plane, at least one of said jets being of metal, a hydrogen duct passing through said base, and means to supply hydrogen at a constant rate to said inner jet through said hydrogen duct, means to supply oxygen, diluted with an inert gas, through said concentric jet, means to feed a sample gas with the hydrogen, a metallic electrode support mounted upon said base, a metallic electrode on said electrode support positioned above said jets, said electrode support and said metallic jet being well insulated from each other by said base, a potential source of at least about 115 volts applying potential between said metallic jet as positive through a grid resistance of $10^6$ to $10^{12}$ ohms to said electrode support, a high impedance means to measure the potential across said grid resistor, and a metallic burner shield which fits closely on said base, and has a foraminous area above said burner jet and which shield is grounded mounted on said base surrounding said jets, metallic electrode and electrode support, whereby any static or current leakage effects are minimized.

8. The apparatus of claim 7 in which the battery and all wires are shielded to increase sensitivity and stability.

References Cited in the file of this patent

UNITED STATES PATENTS

| 2,106,147 | Hull | Jan. 18, 1938 |
| 2,192,920 | Linch | Mar. 12, 1940 |
| 2,511,177 | Richardson | June 13, 1950 |
| 2,622,967 | Lobosco | Dec. 23, 1952 |
| 2,848,306 | Blumer | Aug. 19, 1958 |
| 2,916,358 | Valentine et al. | Dec. 8, 1959 |
| 2,921,841 | Gerrish | Jan. 19, 1960 |

OTHER REFERENCES

Harley: "Nature," 181, 177, 178 (1958).
McWilliam: "Nature," 181, 760 (1958).
Scott: "Manufacturing Chemist," 29, 411–416 (1958).

UNITED STATES PATENT OFFICE
CERTIFICATE OF CORRECTION

Patent No. 3,027,241  
March 27, 1962

Anthony John Andreatch et al.

It is hereby certified that error appears in the above numbered patent requiring correction and that the said Letters Patent should read as corrected below.

Column 5, line 30, for "jet outer" read -- outer jet --; column 7, line 47, after "grid" insert -- resistor --; column 8, line 22, after "this" insert -- filament --; line 59, for "ratio" read -- radio --.

Signed and sealed this 4th day of September 1962.

(SEAL)  
Attest:

ERNEST W. SWIDER  
Attesting Officer

DAVID L. LADD  
Commissioner of Patents